(12) United States Patent
Parker et al.

(10) Patent No.: US 11,907,936 B2
(45) Date of Patent: Feb. 20, 2024

(54) NON-CUSTODIAL, RECOVERABLE WALLET THAT STORES PRIVATE KEY AMONGST MULTIPLE SECURE STORAGE MECHANISMS

(71) Applicant: DefiQ, Inc., Draper, UT (US)

(72) Inventors: Eric Parker, Draper, UT (US); Ethan Parker, Draper, UT (US); David Hurst, Draper, UT (US); Brendan Wanlass, Draper, UT (US); David Bland, Draper, UT (US); Adam Olsen, Draper, UT (US)

(73) Assignee: DefiQ, Inc., Draper, UT (US)

( * ) Notice: Subject to any disclaimer, the term of this patent is extended or adjusted under 35 U.S.C. 154(b) by 0 days.

(21) Appl. No.: 18/133,905

(22) Filed: Apr. 12, 2023

(65) Prior Publication Data

US 2023/0325815 A1 Oct. 12, 2023

Related U.S. Application Data

(60) Provisional application No. 63/330,154, filed on Apr. 12, 2022.

(51) Int. Cl.
*G06Q 20/36* (2012.01)
*G06Q 20/38* (2012.01)
*G06Q 20/40* (2012.01)

(52) U.S. Cl.
CPC ....... *G06Q 20/3674* (2013.01); *G06Q 20/389* (2013.01); *G06Q 20/3821* (2013.01);
(Continued)

(58) Field of Classification Search
CPC .......... G06Q 20/3674; G06Q 20/3821; G06Q 20/3825; G06Q 20/3829; G06Q 20/389; G06Q 20/40145
See application file for complete search history.

(56) References Cited

U.S. PATENT DOCUMENTS

2014/0230023 A1 8/2014 Parks
2018/0336553 A1* 11/2018 Brudnicki ............ G06Q 20/385
(Continued)

FOREIGN PATENT DOCUMENTS

WO WO-2015175854 A2 * 11/2015 ......... A61K 31/4523

OTHER PUBLICATIONS

International Search Report and Written Opinion dated Oct. 12, 2023 for Related PCT/US23/18349.
(Continued)

*Primary Examiner* — Patrick McAtee
*Assistant Examiner* — Vincent I Idiake
(74) *Attorney, Agent, or Firm* — VLP Law Group, LLP; David J. Thibodeau, Jr.

(57) ABSTRACT

A method for securing a split private key (such as used with a cryptocurrency or other non-custodial electronic wallet) amongst a password, biometrics, and a social service. The process may use a sharding scheme such as Shamir's Secret Sharing to ensure that multiple key shards must be obtained before the entire private key can be obtained. The user may select the number of shards required to retrieve the private key thereby controlling the security of the account. An additional shard may be held on an encrypted server and allows for account recovery even while maintaining non-custodial ownership of the wallet.

10 Claims, 6 Drawing Sheets

(52) U.S. Cl.
CPC ..... *G06Q 20/3825* (2013.01); *G06Q 20/3829* (2013.01); *G06Q 20/40145* (2013.01)

(56) References Cited

U.S. PATENT DOCUMENTS

| | | |
|---|---|---|
| 2018/0367298 A1* | 12/2018 | Wright .................. H04L 9/0861 |
| 2019/0318356 A1 | 10/2019 | Martin et al. |
| 2020/0314106 A1* | 10/2020 | Tripathi ................ H04L 9/0894 |
| 2021/0110386 A1 | 4/2021 | Meyer et al. |
| 2021/0211287 A1 | 7/2021 | Roy et al. |
| 2021/0224797 A1* | 7/2021 | Berengoltz ........ G06Q 20/3825 |
| 2023/0055618 A1* | 2/2023 | Jakobsson .......... G06Q 20/3674 |
| 2023/0206218 A1* | 6/2023 | Defour .................. G06Q 20/02 705/67 |

OTHER PUBLICATIONS

Liu et al., Design Patters as-a-service for Blockchain-Based Self-Sovereign Identity, May 5, 2020; [Retrieved from the Internet on].

\* cited by examiner

NON-CUSTODIAL, RECOVERABLE WALLET THAT STORES PRIVATE KEY AMONGST MULTIPLE SECURE STORAGE MECHANISMS

CROSS-REFERENCE TO RELATED APPLICATIONS

This application claims priority to U.S. Provisional Patent Application Ser. No. 63/330,154 filed Apr. 12, 2022 entitled "SPLITTING UP PRIVATE KEY AMONGST MOBILE DEVICE BIOMETRIC, PASSWORD, AND THIRD-PARTY LOGINS AND REASSEMBLING VIA SHAMIR SECRET SHARING", the entire contents of which are hereby incorporated by reference.

BACKGROUND OF THE INVENTION

This patent application relates to protection of private keys, such as used in digital wallet, blockchain and/or other distributed finance (DeFi) applications.

U.S. Patent Publication US2019/0354972 explains that cryptocurrencies (such as Bitcoin) or tokens created with certain blockchains may be defined by a public key and private key pair. A digital asset transaction (e.g., a digital asset transfer) is digitally signed with the original owner's private key, and any external observer can verify it by using the corresponding public key. The private key can be protected by dividing it into multiple parts, making multiple copies of each part of the private key, and storing the multiple parts in different secure places.

U.S. Patent Publication US2016/0241390 describes a cloud-based service that securely stores and transmits parts of encryption keys. This approach can include splitting the key in two and storing at least one of them on a remote secure server.

U.S. Patent Publication US2019/0318356 describes a method for offline storage of a cryptocurrency private key. The method includes encrypting the cryptocurrency private key using a primary encryption key; splitting the encrypted cryptocurrency private key into a plurality of alpha shards; generating beta shards by encrypting the alpha shards with secondary encryption keys; and then storing representations of the beta shards offline. The offline storage may be cloud storage.

SUMMARY OF THE INVENTION

Creation of an encrypted digital wallet for cryptocurrency, blockchain, or other decentralized transactions requires generation of both a public and private key, where the private key gives access to and control of the wallet and the funds that the wallet holds. Historically, this private key has been created and maintained on behalf of users by either a centralized custodian (e.g. Coinbase, Crypto.com, etc.) or a non-custodial service (e.g. MetaMask). In the case of a non-custodial wallet, the private key is given to the end user over the internet in the form of a "seed phrase" or "pass phrase". Possession of the passphrase is the one and only item needed to gain access to the private key and thus control of the wallet.

For users of non-custodial accounts, the seed phrase must therefore be aggressively guarded and hidden from would be hackers and thieves, but not so hidden that it risks becoming lost. If a seed phrase were to be misplaced, forgotten, or destroyed, all access to the account would be lost and non-custodial generators of seed phrases have no way to recover the account. This creates a balancing act for non-custodial wallet users who have competing objectives of making the private key as inaccessible as possible and yet readily available for any transaction they wish to make.

The solution is a self-custodial, yet recoverable wallet—recovery via 2FA and biometrics. The solution provides a self-custodial, secure, yet fully recoverable digital wallet. The approach first breaks up the private key amongst a variety of secure storage points (referred to as "shards" herein). The secure storage points may be accessed by an application password, biometric device security (e.g. FaceID or thumbprint), two factor authentication services, or in other ways. The storage points may include file storage services, social media accounts, or other internet accessible storage points.

The user picks as many supported shards as they wish to increase the security of their account. In particular, the user must specify a minimum number of shards that must be known in order to recreate the private key.

The methodology for splitting the private key may be Shamir Secret Sharing or some other algorithm that splits apart keys into components or shards. Each of the shards is encrypted and stored in various secure locations. Using Shamir Secret Sharing, for example, a minimum number of components or shards are required to be known to recreate the private key.

With the unique approach more fully described below, a mobile application manages the resulting shards in a certain way. More particularly, the mobile application prompts the user to select among two or more of their social logins, authenticator applications, web and mobile native platforms, or other secure key storage methods. The mobile application then accesses these various accounts to securely store and retrieve the shards of the private key "behind the scenes", without further interaction by the user.

When the user subsequently initiates a transaction within the mobile application, the user is prompted to authenticate with any of their various accounts. Once this occurs, the mobile application then accesses the various services and local storage, and brings the shards back together to reconstitute the private key. The wallet app can then use the private key to process the secure transaction, ensuring that the shards are only assembled for the brief time it takes to complete the transaction.

Using this approach, the private key only comes into existence for a brief moment when a transaction needs to be posted using the key, such as by providing access to the wallet by a cryptocurrency or blockchain service, a smart contract application, or some other decentralized financial (DeFi) application. The fully instantiated private key never needs to cross a network such as the Internet, and only a selected subset of the shards are retrieved using a network connection to service. Thus, even if one of these services used to store the shards is compromised, the full wallet private key will not be compromised. Also note that if the user loses their password, the wallet private key can still be recovered from the shards.

BRIEF DESCRIPTION OF THE DRAWINGS

Additional novel features and advantages of the approaches discussed herein are evident from the text that follows and the accompanying drawings, where.

DETAILED DESCRIPTION

Introduction

The systems and processes described herein are implemented within a digital wallet application that interacts with several different cloud services to securely store and retrieve a private key or other sensitive information.

Figure 1:
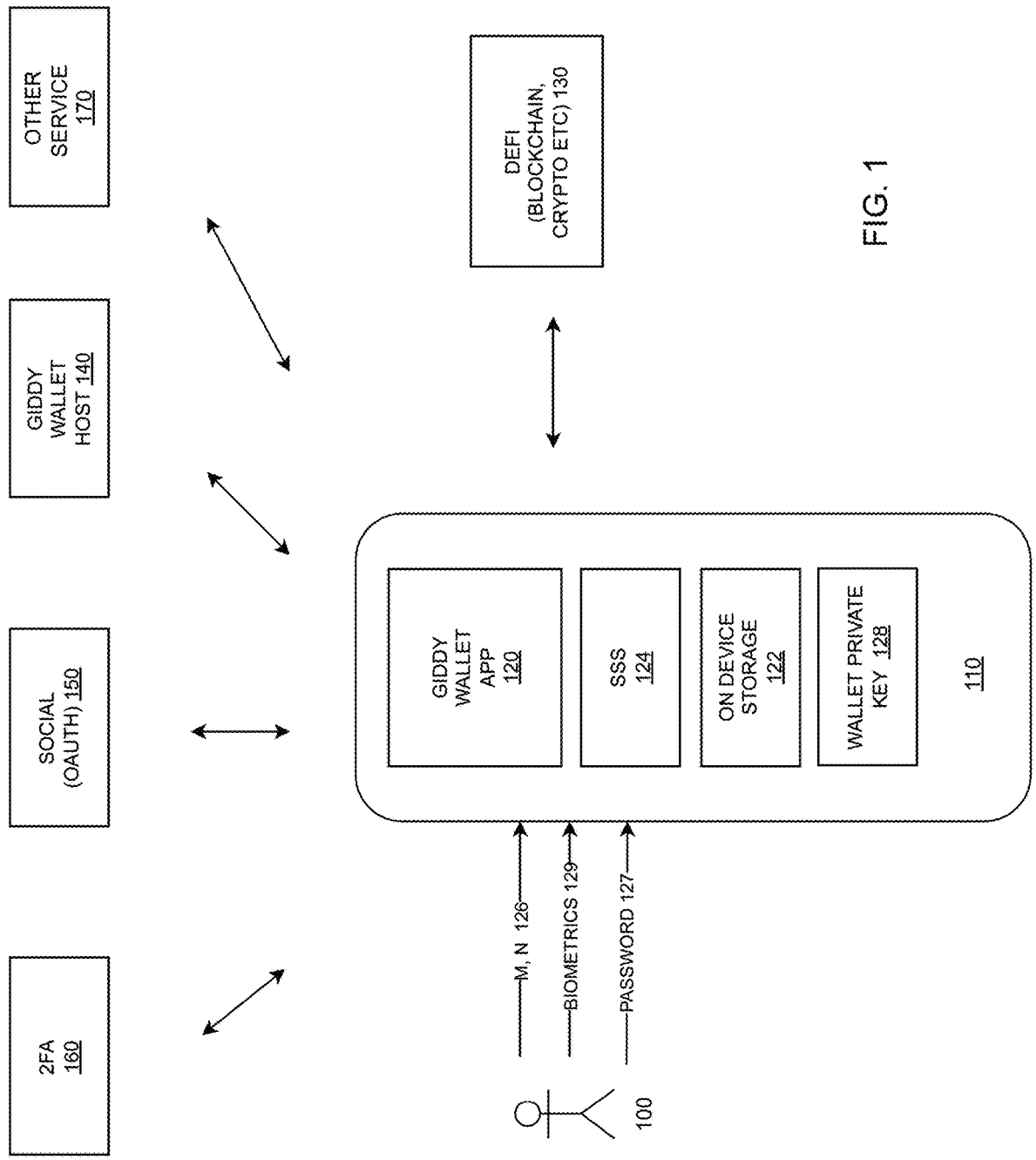
FIG. 1 is a high level diagram of the components of a self-custodial digital wallet that securely stores private keys.

Turning attention to FIG. 1, a user 100 operates a mobile device 110 to run a mobile digital wallet application that we call the Giddy™ wallet app 120. (Giddy is a trademark of DefiQ Corporation of Draper, Utah). The Giddy wallet app 120 enables use of a self-custodial (e.g., non-custodial) digital wallet to engage in a decentralized financial (DeFi) transaction operated by a service 130 such as a cryptocurrency exchange, blockchain, smart contract, or similar service. Such a transaction requires the generation of one or more public and private keys. The public/private key pair generated can then be used for natively supported blockchain transactions, including things such as peer to peer payments, signing smart contracts, secure digital messaging, and other functions that leverage cryptographic keys.

The Giddy app 120 prompts the user to set a login passcode, to activate biometrics, and to sign in with other services such as cloud services in order to activate their digital wallet. In particular, the Giddy app 120 interacts with a trusted cloud service referred to herein as the Giddy wallet host 140.

The Giddy app 120 and host 140 manages the keys, including a wallet private key 128 in a particular manner described below. Management of the wallet private key 128 includes executing a sharding algorithm such as Shamir Secret Sharing (SSS) 124 to split and reconstruct the private key 128 into shards. Private key management also involves interacting with various cloud services such as a social service 150, two factor authentication (2FA) service 160, and other services 170. These may include specific approaches that leverage OAuth or other methods for secure access delegation, two factor authentication (2FA) via Short Message Service (SMS) or an authenticator application, recovery phrase generation by the user, access to secure device file(s) via biometrics and equivalent approaches.

The user has two customization parameters 126 to select when creating his or her digital wallet. First, she must decide how many shards will be needed to reconstruct the wallet private key 128. Three shards may be created by default; however, a user can also select as many as they wish but no fewer than two. This minimum number of shards selected by the user will be referred to as "n" herein.

Second, the user will select as many account options as they wish to reconstruct the private key, and she will be required to use at least two. The letter "m" thus refers to the total number of credentials the user has selected for authentication. It will always be greater than or equal to n.

Examples of possible options for storing key shards include:

On-device storage. This is the storage 122 local to the device 110. It is not the biometric device security metadata itself, although it is protected by the device's 110 local security processes (such as Face ID, a thumbprint, or a passcode, etc.). In the event that the device 110 itself does not natively provide sufficient local security (such as an Android device), the user can be required to create a device PIN code to enable device encryption). This on-device data is thus encrypted by the Giddy app 120 before it is saved to the device 110. It may also be encrypted again by the device itself when saved.

Recovery Phrase. A recovery phrase is also mandatory for the user to create. A shard may then be stored locally 122 or via one of the cloud services 170 as an encrypted file that is protected by this phrase.

Recovery shard. This shard is held on an isolated private encrypted server (e.g., the Giddy host 140). This allows user 100 to have a backup for recovering their private keys without granting the Giddy host 140 access to their private key. If, for example, a user selected to require two shards to recreate her private key and she set up a password and on-device storage, if she loses her device 110 she normally then also loses access to her private key 128. However, the recovery shard held by the Giddy host 140 provides this additional backup so the user can obtain the required two shards and recover her private key while still preventing access by Giddy host 140 which has only one of the required shards. This Multi-Party Computation (MPC) sharding feature is enabled by default; however, the user may opt out of this if they wish.

Social shards. The user can create as many additional shards as they wish for authentication using supported accounts (e.g. Facebook, Twitter, Google, Apple, etc.). Access to these accounts may be controlled by OAuth or some other mechanism for users to grant websites or applications access to their information on other websites but without giving them their passwords to those sites. Example OAuth accounts may include the users Google, Facebook, Microsoft, and/or Twitter accounts.

Multifactor authentication. The user can request that a shard be protected by an authenticator application (e.g. Authy, Google Authenticator, Microsoft Authenticator, 1Password, etc.).

The various shards may thus be stored and secured in various ways. We describe one particular method for doing so in connection with FIG. 4 below. However, other methods may then store the shards amongst a network of nodes (such as Torus network) and retrieved via conventional authentication flows. One appropriate authentication flow may be a pluggable suite such as Web3Auth for Web3 wallets and applications.

The Giddy mobile app 120 and cloud applications thus use the various accounts as inputs for the splitting process and securely break apart the private key behind the scenes. When the user initiates a transaction within the application, they are prompted to authenticate with any of the various accounts selected from the initial login, and a minimum of two must be selected. Once this occurs, the process outlined above brings the shards back together to process the blockchain transaction requested by the user in the Giddy app.

High Level Workflows for Private Key Storage and Retrieval

Figure 2:
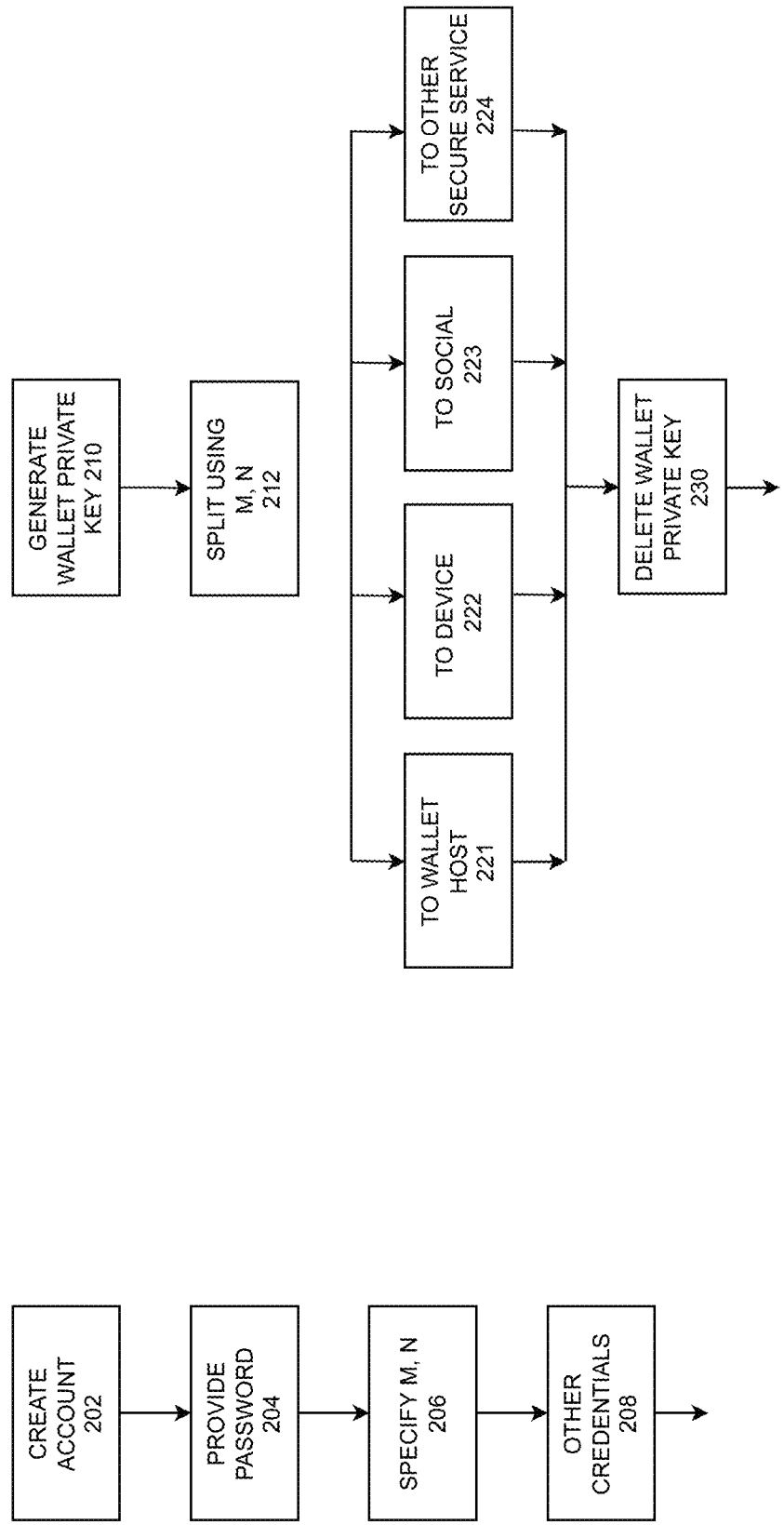
FIG. 2A is a flow for recording user credentials and parameters for key sharding.
FIG. 2B is a flow for splitting a wallet private key into shards and securely storing the resulting shards.

FIG. 2A is an example of the resulting workflow executed by the Giddy wallet app 120 to create a user account.

In a first state 202, the user creates an account. In state 204 the user creates a recovery phrase which will be later used for private key recovery.

Next, in state 206, the user provides the two parameters n and m that will be used to split their private wallet keys into shards.

In state 208, the user may provide other credentials to access their social accounts, such as authorizing access via OAuth or in other ways.

FIG. 2B is an example high level workflow executed by the Giddy wallet app 120 to securely generate and store a wallet private key 128.

In a first state 210, the private wallet key is generated. This may be generated from a passphrase or other token provided to the Giddy app from the DeFi service 130.

Next, state 212 splits the wallet private key 128 into shards using the m and n parameters specified by the user.

The shards are then securely distributed to the Giddy host (state 221), local device storage (state 222), or other services (state 224), depending on which options the user has enabled. In addition, tokens or other data may be returned from a social account (state 223).

In state 230 the wallet private key is deleted from the device 110.

Figure 3:
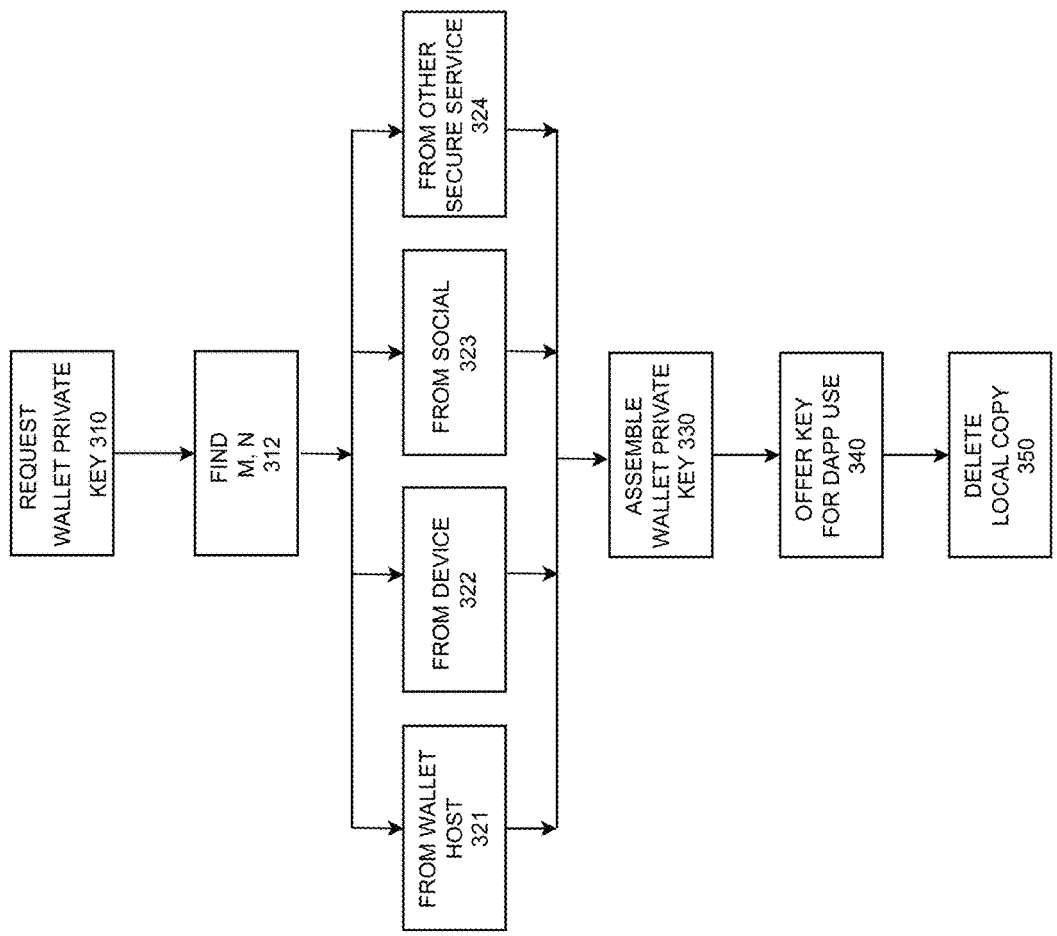
FIG. 3 is a flow for retrieving the wallet private key.

FIG. 3 is a high level flow for retrieval of a user's wallet private key 128.

In state 310 a request for access to the private key 128 is received after the user has logged in or otherwise authenticated herself to the Giddy app 120. This state 210 may be entered as a result of the user requesting the Giddy app 120 to generate the private key 128 in connection with a transaction to be completed via the DeFi service 130.

In state 312 the user's metadata is accessed to retrieve their m and n parameters or other metadata relevant to the underlying cryptography.

Shards are then retrieved from the Giddy host (state 321), local device storage (state 322), social accounts (state 323) or other secure storage services (state 324) depending on the user's configuration metadata.

In state 330 the retrieved shards are then used to assemble the wallet private key 128 such as via the SSS algorithm 124.

The wallet private key 128 is then available for use in state 340, together with data assembled from other sources (such as the user's public key) to encrypt the data related to a transaction with the DeFi service 130.

After the transaction is complete, the wallet private key is deleted in state 350. Note that the private key has never crossed the Internet and has only existed in application memory for the brief time needed to sign a cryptographic message.

Specific Example of Retrieving a Wallet Private Key

Figure 4:
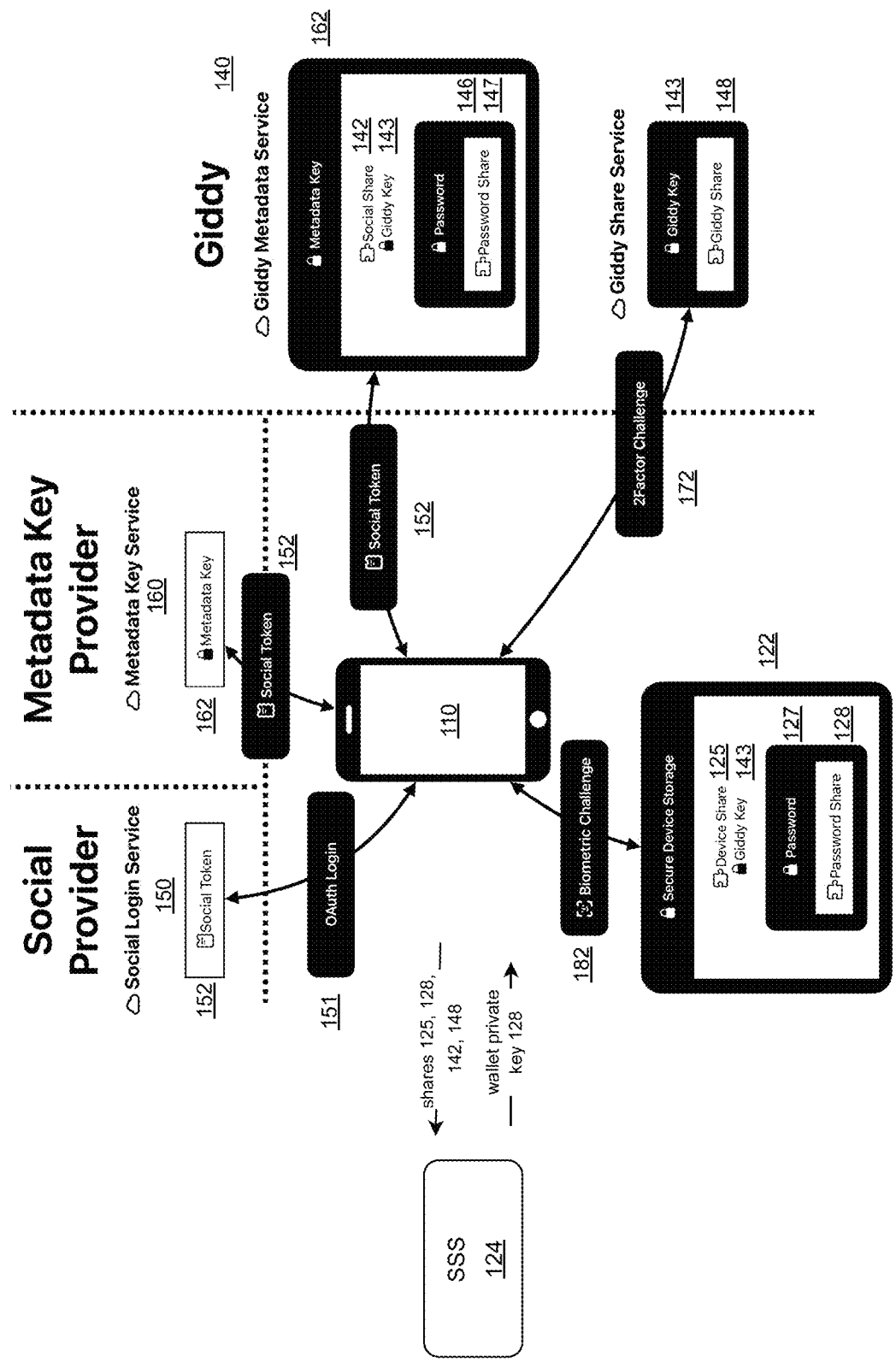
FIG. 4 is a more specific implementation of the wallet private key retrieval process.

FIG. 4 is a more detailed view of a specific implementation of a process implemented by the Giddy mobile app 120 for retrieving multiple shares of wallet private key. Shown are the user's personal device 110 running the Giddy app 120, its local device secure storage 122. Several cloud services accessed by the personal device 110 are also shown. These cloud services include the Giddy metadata service 140, a Giddy secure share service 145, a social login service 150, and a metadata key provider 160.

In this example, the user has selected to shard the wallet private key into four (4) shares (m=4), including a device share 125, a password-protected share 128, a social share 142 and a Giddy share 148 and has selected an SSS algorithm that can recover the private key from a minimum of three (n=3) of these four shares.

The user first logs in to the Giddy app 120 using their password. The Giddy app 120 then uses a service such as OAuth 151 to login to the social service 150 and retrieve a social token 152.

A biometric 182 is then used to unlock local device storage 122. This retrieves the device share 125 as well as a Giddy key 143. The user's password 127 also provides access to the password share 128 stored in the local device storage 122.

Next the social token 152 is used to retrieve a metadata key 162 from metadata key service 160.

The social token 152 and metadata key 162 then provide access to the Giddy metadata service 140 to enable retrieval of the social share 142 and Giddy key 143. Note that the password 127 may also provide access to the password share 147 in this example.

A two-factor authentication (2FA) challenge 172 may be utilized to authenticate to the Giddy share service 145. This enables passing the Giddy key 143 to that service 145 and retrieve the Giddy share 148. Note that even after the 2FA challenge is passed. the user device 110 must still contain a key (the Giddy key 143) in order to decrypt the Giddy share 148 information retrieved.

At this point the device share 125, a password share 128, social share 142 and Giddy share 148 have been retrieved and can be passed to the Shamir Secret Sharing algorithm to reconstruct the user's private key. The private key can then be used to encrypt whatever data and metadata needed to execute a transaction with the decentralized finance service 130 (FIG. 1) or for other purposes.

Note again that whenever these shares are gathered, they are processed with the encryption algorithm only on the device 110 itself. The full wallet private key 128 has therefore never crossed the network, and only a selected subset of the shares are retrieved using the network. Thus, even if the cloud services 150, 160, are compromised, the full wallet private key 128 will not be. Also note that if the user loses their password, the wallet private key 128 can still be recovered from the shares.

It can now be understood how a user's wallet private keys may be generated locally, on their mobile device, so that sensitive information sufficient to access their wallet never crosses the internet. None of the providers of the various cloud services hold a sufficient number of the secrets to generate the shares.

In addition, the user herself supplies important parameters such as the sharding criteria m and n.

Furthermore, even if the user's device 110 is compromised, the wallet private key is protected, since it is never stored on the device 110.

Also, even if the Giddy metadata service 145 is compromised, no private keys are stored therein and thus the users wallet is not lost.

Example Detailed Flow on App Launch

Figure 5:
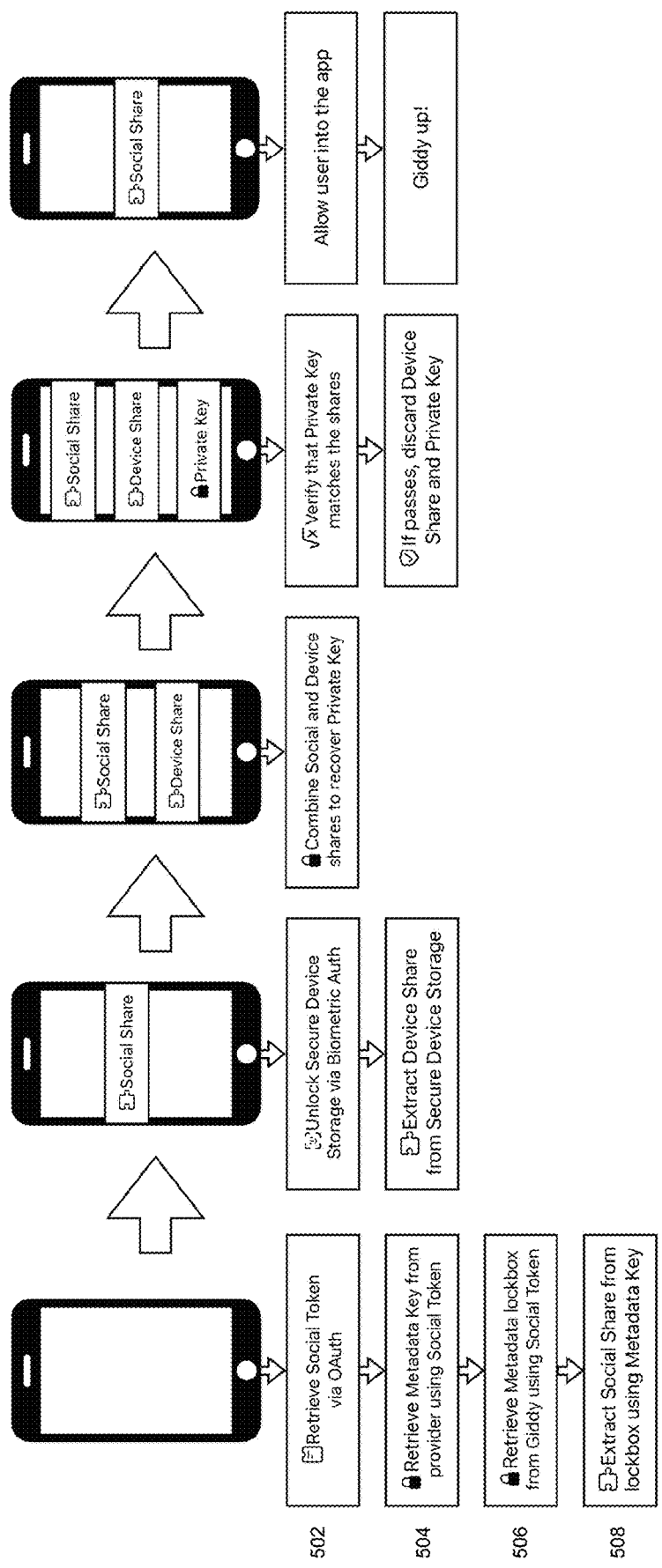
FIG. 5 is a more specific flow that may be executed when the mobile application is launched.

FIG. 5 is a more detailed flow executed when the Giddy app 120 is launched. In a first state 504 the social token is retrieved via OAuth. In the next state 504 the metadata key is retrieved from the metadata provider 160 using the social token. In state 506 the metadata lockbox is retrieved from the giddy service 140 using the social token. State 508 extracts the social share from the lock box using the metadata key.

In state 512 the local secure device storage 122 can now be unlocked via the biometric challenge. In state 514 the device share can be extracted from secure device storage 122. In state 522 the social and device shares can now be combined to recover the private key.

In state 532 it can be verified that the newly constructed private key matches the shares, in state 534 if the matching step passes then the device share and private key are discarded.

In state 542 the user is then allowed to access the underlying application to complete the transaction in state 544.

Example Detailed Flow for Transaction Signing

Figure 6:
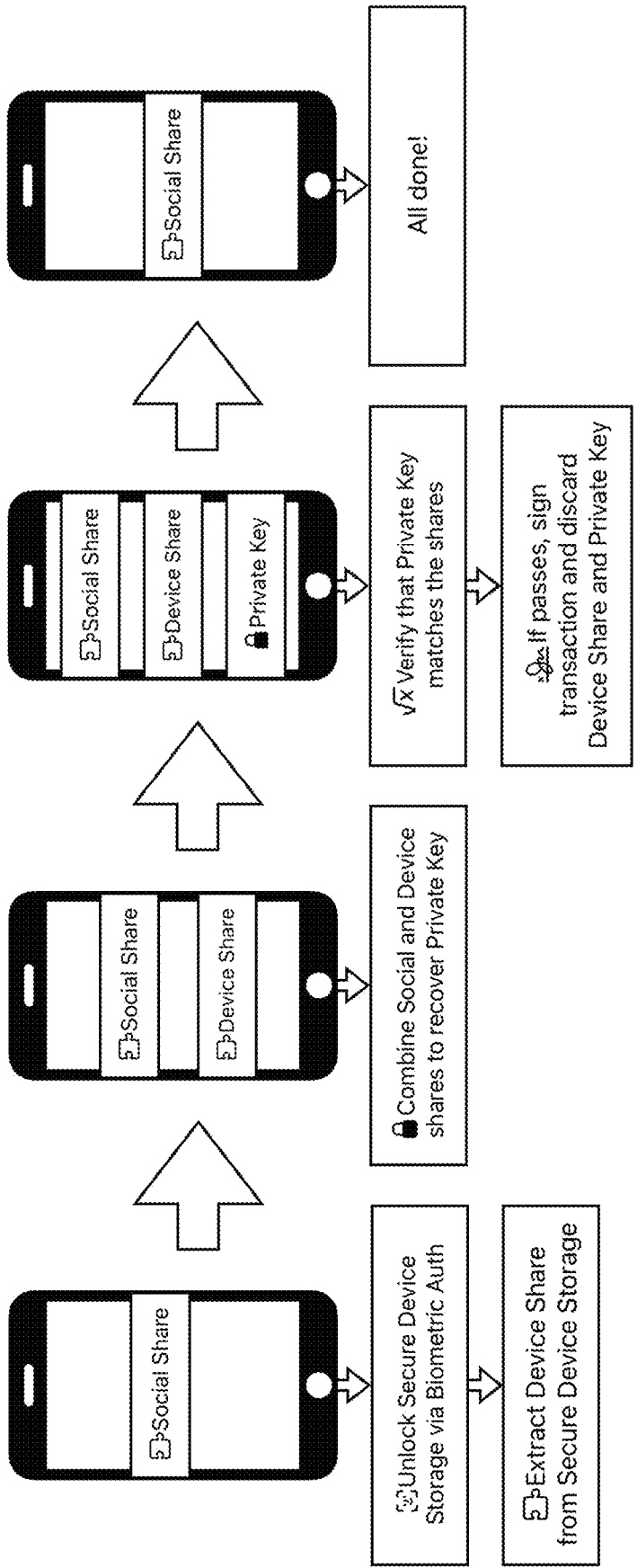
FIG. 6 is a more specific flow that may be executed to sign a transaction.

FIG. 6 is an example of a detailed flow that can be used to sign a transaction. In state 612 the local secure device storage 122 may be unlocked via biometric authorization. The device share is then extracted in state 614 from the local secure device storage 122.

State 622 combines the social share and device share to recover the private key.

In state 632 the private key is verified as matching the shares, and in 634 if the match passes then the transaction can be signed.

Finally, the device share and private key can be discarded in state 644 and the transaction is complete.

Further Observations and Options

Note that with the approach shown in FIG. 4, the metadata key 162 and Giddy key 143 are private encryption keys, but are not the wallet private key 128. Because the Giddy app 120 does not upload the full wallet private key 128 anywhere, the full private key 128 is only reconstructed in the Giddy app 120 as needed and then deleted. Remote cloud providers 150, 160, etc. need only manage encryption keys, tokens, and encrypted data/shares, but do not access the user's wallet private key 128.

The device share 125 is stored in secure device storage 122, and the password share 128 is also stored there—albeit doubly-locked with both the recovery password 127 and secure device storage 122. This allows offline recovery of the password share 128, but the wallet private key itself is never stored, so an adversary cannot recover it without passing multiple challenges.

During an event where a brand new public/private key pair are needed (that is, when a new "wallet" is created), the mobile device generates a polynomial (the function that produces the key shares such as via SSS), and the Giddy app 120 generates the shares (shards) themselves and a Giddy key 143.

The metadata key 162 is generated by the metadata key service 160 such as from the social token 152. The social token is in turn generated by logging into the metadata key service 160. In other words, the metadata key 162 is protected by a secret owned by Google, and is not accessible by the Giddy host 140. Note also that the metadata key 162 is never sent to the Giddy host 140, making it impossible for the operator of the Giddy host 140 to decrypt metadata, which also makes it impossible for the operator of the Giddy host 140 to decrypt the encrypted Giddy share 148.

The social token 152 is maintained by the social provider service 150. The social token 152 is thus also not generated on the Giddy host 140.

The Giddy share service 145 manages a two-factor challenge 160 with the user 100. During wallet private key 128 creation, that service 145 receives an encrypted payload, but it cannot decrypt that payload, and the only thing it can do is hand that payload back if the two-factor challenge is met.

The Giddy host 140 stores an encrypted metadata "lockbox" protected by the metadata key 162 and an encrypted Giddy share "lockbox" protected by the Giddy key 143. The Giddy host never receives the keys to those two lockboxes, so it cannot open them.

The lockboxes contain information used by the mobile device to begin reconstruction of the wallet private key.

Giddy host 140 server interacts with the social token 152 to authorize storage and release of the metadata lockbox. This acts as a signed payload that lets the Giddy host 140 server know the request is correctly authorized with the social provider 150. However, this social token does not empower the Giddy host 140 to generate such request messages itself. The result is that the operator of the Giddy service 140 cannot open a metadata "lockbox" without a freshly generated user token.

In this scenario, the process is initiated with a social token. So, when the user logs into the Giddy app 120, that then leads to a login to the provider of the social service 150, which in a preferred embodiment may be Google or Apple where the login can be via OAuth and the user's email credentials. This provides a high degree of certainty that the person who actually owns this account is the one who just signed in. This results in retrieval of the social token 152 permitting the Giddy app to initial assembly of the private key.

Of note here is that the shards (including the device share 125, social share 142, password share 147, and Giddy share 148) live in different various places. Thus in some embodiments, there may be some metadata 149 that describes where these shares live. Such metadata 149 may be stored in the Giddy metadata service 140 protected by the metadata key 162 as returned from the metadata service 160 that describes how these shards are related to each other.

In one example implementation, that metadata 149 may describe the particular polynomial used by the SSS algorithm 124 to reconstruct the wallet private key, albeit without the specific coefficients. The shares themselves then provide the missing coefficients to reconstruct the private key.

The user 100 will typically be required to have set up certain security features on their mobile device. For example, operation of the Giddy app 120 may require that the user has set up a PIN code, or biometrics such as a fingerprint or FaceID as a prerequisite.

Note that since the social share is not generated by the Giddy app 120 or the Giddy host 140, in the event that either of those are hacked the user's wallet private key 128 will not be compromised.

As an additional security measure, in some implementations, the social token 152 should be automatically regenerated on a regular basis by the social provider 150, such as every 60 seconds.

It is also possible with this approach to recover the private key 128 even if internet access is not available. For example, if m=2, the Giddy app 120 may still retrieve all of the information needed such as from the device share 125 and password share 128.

Similarly, in the event there is a catastrophic event (such as the failure of a Google social login service 150 and/or Giddy share service 145) the Giddy app 120 is still able to recover the wallet private key.

As shown in FIG. 4, the Giddy share service 145 is accessed via a two factor challenge and provides another mechanism for recovery of the wallet private key. In this scenario, the user 100 may opt to allow the Giddy share service 145 to store an additional backup factor that will help recover their wallet, in case they lose access to other services.

When this is implemented, the social share 142, the password share 147, and the device share 125 are used to create a new share called the Giddy share 148 that is encrypted with a key (the Giddy key 145) that the user owns. This is then stored by the Giddy service 145 protected by two factor authentication 160 (such as via SMS to a trusted mobile phone or via an authenticator app like Google Authenticator). As a result, only the user can access that storage to retrieve the social share 142, password share 147 and device share 145.

In some implementations, another mechanism such as a physical YubiKey or Near Field Communications (NFC) card may be accessible to the Giddy app 120 and then utilized to store one or more of the shares.

Other Details and Options

The foregoing description provides illustrations and description of example systems and methods for protecting a user's private key for blockchain, smart contracts and other decentralized finance applications, but is not intended to be exhaustive or to limited to the precise form disclosed.

It should be understood, therefore, that the embodiments described above may be implemented in many different ways. In some instances, the various data processing systems and devices described herein may each be implemented by a separate or shared physical or virtual general purpose computer having a central processor, memory, disk or other mass storage, communication interface(s), input/output (I/O) device(s), and other peripherals. The general purpose computer is transformed into the processors with improved functionality, and executes stored programs to perform the processes described above, to provide improved operations. The processors may operate, for example, by loading software instructions, and then executing the instructions to carry out the functions described. Network interface(s) allow the computer(s) to connect to various other computers and devices attached to a network. Memory provides volatile storage for computer software instructions and data used to implement an embodiment. Disk or other type of mass storage provides non-volatile storage for computer software instructions and data used to implement, for example, the various procedures described herein.

Embodiments may therefore typically be implemented in hardware, firmware, software, or any combination thereof. In some implementations, the computers that execute the processes described above may be deployed in a cloud computing arrangement that makes available one or more physical and/or virtual data processing machines via a convenient, on-demand network access model to a shared pool of configurable computing resources (e.g., networks, servers, storage, applications, and services) that can be rapidly provisioned and released with minimal management effort or service provider interaction. Such cloud computing deployments may sometimes be preferred as they allow multiple users to access computing resources. By aggregating demand from multiple users in central locations, cloud computing environments can be built in data centers that use the best and newest technology, located in the sustainable and/or centralized locations and designed to achieve the greatest per-unit efficiency possible.

Furthermore, firmware, software, routines, or instructions described herein as performing certain actions and/or functions may be implemented on physical devices such as servers, personal computers, mobile devices and the like. Therefore, it should be appreciated that such descriptions contained herein are merely for convenience and that such actions in fact result from various types of computing devices, processors, controllers, or other devices executing the firmware, software, routines, instructions, etc.

It also should be understood that the block, flow and network diagrams may include more or fewer elements, be arranged differently, or be represented differently. It further should be understood that certain implementations may dictate the block, flow and network diagrams and the number of block, flow and network diagrams illustrating the execution of the embodiments be implemented in a particular way.

Other modifications and variations are possible. For example, while a series of steps has been described above with respect to the flow diagrams, the order of the steps may be modified in other implementations. In addition, the steps, operations, and elements may be performed by additional or other modules or entities, which may be combined or separated to form other modules or entities. For example, while a series of steps has been described with regard to certain figures, the order of the steps may be modified in other implementations consistent with the same or analogous principles. Further, non-dependent steps may be performed in parallel.

The invention claimed is:

1. A method for operating a self-custodial electronic wallet application associated with a user and executing on a user device, the method comprising:
   receiving a request to execute a transaction with a decentralized finance service;
   retrieving a public key and private key pair needed to execute the transaction, the private key further retrieved by:
   accessing metadata associated with the user to determine:
      a user-specified passphrase;
      a user-specified sharding parameter previously specified by the user; and
      user access credentials for a social service;
   accessing the social service via the user credentials to retrieve a social token;
   accessing a metadata key service via the social token, to retrieve a metadata key;
   accessing a trusted host service, using the social token and the metadata key, to:
      retrieve a social share; and
      further using the passphrase, retrieve a passphrase share; accessing local storage on the user device, via a biometric, to retrieve a device share;
   using two or more of the social share, the device share, and passphrase share to reconstruct the private key only in memory of the user device;
   encrypting the transaction using the private key and public key; and forwarding the encrypted transaction to the decentralized finance service.

2. The method of claim 1 wherein the social service periodically regenerates the social token without intervention from the wallet application or the trusted host service.

3. The method of claim 1 wherein the access to the social service is provided by an OAuth compliant service.

4. The method of claim 1 further comprising:
   using the social share and the metadata key to retrieve a wallet host key; and
   using the wallet host key to retrieve a wallet host share, the wallet host share further composed of at least one of the device share or password share.

5. The method of claim 4 wherein the step of using the wallet host key further comprises:
   authenticating the wallet host key using two factor authentication.

6. An apparatus for operating a self-custodial electronic application associated with a user and executing on a user device, the apparatus comprising:
   one or more data processors; and one or more computer readable media including instructions that, when executed by the one or more data processors, cause the one or more processors to perform a process for:

receiving a request to execute a transaction with a decentralized finance service;

retrieving a wallet private key as needed to execute the transaction, the wallet private key further retrieved by the steps of:

accessing metadata associated with the user to determine:
 a user-specified passphrase; and
 user access credentials for a social service;

accessing the social service via the user credentials to retrieve a social token;

accessing a metadata key service via the social token, to retrieve a metadata key;

accessing a trusted host service, using the social token and the metadata key, to:
 retrieve a social share; and
 further using the passphrase, retrieve a passphrase share; accessing local storage on the user device, via a biometric, to retrieve a device share; and using the user-specified sharing parameter and two or more of the social share, the device share, and passphrase share to reconstruct the private key only in memory of the user device;

encrypting the transaction using the private key and public key; and forwarding the encrypted transaction to the decentralized finance service.

7. The apparatus of claim 6 wherein the social service periodically regenerates the social token without intervention from the wallet application or the wallet host service.

8. The apparatus of claim 6 wherein the access to the social service is provided by an OAuth compliant service.

9. The apparatus of claim 6 wherein the instructions further cause the one or more processors to perform a process further comprising:

using the social share and the metadata key to retrieve a trusted host key; and using the trusted host key to retrieve a wallet host share, the wallet host share further composed of at least one of the device share or password share.

10. The apparatus of claim 9 wherein using the wallet host key further comprises:

authenticating the trusted host key using two factor authentication.

\* \* \* \* \*